us011490616B2

(12) United States Patent
Tanaka (10) Patent No.: US 11,490,616 B2
(45) Date of Patent: Nov. 8, 2022

(54) PLANT GROWTH PROMOTING AGENT

(71) Applicant: CHUETSU PULP & PAPER CO., LTD, Takaoka (JP)

(72) Inventor: Hiroyuki Tanaka, Takaoka (JP)

(73) Assignee: CHUETSU PULP & PAPER CO., LTD, Takaoka (JP)

( * ) Notice: Subject to any disclaimer, the term of this patent is extended or adjusted under 35 U.S.C. 154(b) by 324 days.

(21) Appl. No.: 16/496,616

(22) PCT Filed: Mar. 23, 2018

(86) PCT No.: PCT/JP2018/011666
§ 371 (c)(1),
(2) Date: Dec. 9, 2019

(87) PCT Pub. No.: WO2018/174239
PCT Pub. Date: Sep. 27, 2018

(65) Prior Publication Data
US 2020/0138016 A1    May 7, 2020

(30) Foreign Application Priority Data
Mar. 24, 2017 (JP) .............................. JP2017-058732

(51) Int. Cl.
*A01N 25/04* (2006.01)
*A01N 61/00* (2006.01)
*D01F 2/00* (2006.01)

(52) U.S. Cl.
CPC .............. *A01N 25/04* (2013.01); *A01N 61/00* (2013.01); *D01F 2/00* (2013.01)

(58) Field of Classification Search
CPC .. A01N 25/04; D01F 2/00; C08L 1/02; D21H 11/18
See application file for complete search history.

(56) References Cited

U.S. PATENT DOCUMENTS

| | | | | |
|---|---|---|---|---|
| 2,816,851 | A | * | 12/1957 | Arledter ............... B44C 5/0476 428/211.1 |
| 5,140,017 | A | | 8/1992 | Pickford |
| 2015/0017432 | A1 | * | 1/2015 | Shoseyov ............... G02B 1/10 428/336 |

FOREIGN PATENT DOCUMENTS

| | | | |
|---|---|---|---|
| CN | 106305794 | A | 1/2017 |
| JP | 3-505876 | A | 12/1991 |
| JP | 7-126105 | A | 5/1995 |
| JP | 11-225590 | A | 8/1999 |
| JP | 2016-94516 | A | 5/2016 |
| JP | 2017048293 | A * | 3/2017 |
| WO | 2012/029433 | A1 | 3/2012 |
| WO | 2018/083539 | A2 | 5/2018 |

OTHER PUBLICATIONS

International Search Report for PCT/JP2018/011666 dated, Jun. 26, 2018 (PCT/ISA/210).

* cited by examiner

*Primary Examiner* — Dominic Lazaro
(74) *Attorney, Agent, or Firm* — Sughrue Mion, PLLC (57) ABSTRACT

A plant growth promoting agent which contains cellulose nanofibers and which is directly or indirectly applied to, sprinkled on, or sprayed on a plant. By using cellulose nanofibers having a specific average fiber diameter and a specific average fiber length, agglomeration of the cellulose fibers is thereby suppressed. This enables efficient insecticidal effect to be realized, wherein the insecticidally active ingredient is a non-chemosynthetic material.

7 Claims, 9 Drawing Sheets

0.1% CNF was sprinkled
Plant: Ivy
directly sprinkled on two-spotted spider mites

FIG. 5

<Side Benefit> Observation on Leaves: leaves collected from the trees on which the dispersion was sprinkled were

PLANT GROWTH PROMOTING AGENT

This Application is a National Stage of International Application No. PCT/JP2018/011666 filed Mar. 23, 2018, claiming priority based on Japanese Patent Application No. 2017-058732 filed Mar. 24, 2017.

TECHNICAL FIELD

The present invention relates to a plant growth promoting agent which comprises, as an active ingredient, cellulose nanofibers that have an average thickness of 3 to 200 nm and that are prepared by fibrillating cellulose by means of a highly pressurized water jet and which can be used in the form of a spray.

BACKGROUND ART

Heretofore, some kind of compound is frequently used as an active ingredient of a spray agent. On the other hand, with respect to Tyrophagus putrescentiae, spider mite, aphid, thrips, coccid, oribatid or the like, natural enemy mites are periodically sprinkled to effect predation. The natural enemy mites are sprinkled on leaves once in 1.5 to 2.5 months.

With a view to providing an animal ectoparasiticidal composition having excellent efficacy, Patent Document 1 discloses an animal ectoparasiticidal composition which comprises an insecticidal ingredient (I) [wherein Q represents a C1-C3 haloalkyl group having at least one fluorine atom, or a fluorine atom; R1 and R3, which may be the same or different, represent a C1-C4 chain hydrocarbon group that may be substituted by a halogen atom, a halogen atom or a hydrogen atom; R2 and R4, which may be the same or different represent, C1-C4 chain hydrocarbon group that may be substituted by a halogen atom, —C(=G)R5, a cyano group, a halogen atom or a hydrogen atom; and G represents an oxygen atom or a sulfur atom.] and an adipic acid ester; and a method for controlling an animal ectoparasite which characteristically comprises administration of an effective amount of the animal ectoparasiticidal composition to animals.

With a view to providing an insect pest control agent and a method for controlling insect pests which have excellent attract-controlling effect on insect pests, Patent Document 2 discloses an insect pest control agent comprising cocoa and an insecticidal active ingredient, and a method for controlling insect pests which comprises application of effective amounts of cocoa and the insecticidal active ingredient onto a habitat of insect pests.

With a view to providing an insect pest control agent and a method for controlling insect pests which have excellent attract-controlling effect on insect pests, Patent Document 3 discloses an insect pest control agent comprising at least one member selected from the group consisting of milk, cheese, coffee and egg, and an insecticidal active ingredient, and a method for controlling insect pests which comprises application of effective amounts of the at least one member selected from the group consisting of milk, cheese, coffee and egg and the insecticidal active ingredient onto a habitat of insect pests.

PRIOR ART DOCUMENTS

Patent Documents

Patent Document 1: Japanese Unexamined Patent Publication No. 2011-153129

Patent Document 2: Japanese Unexamined Patent Publication No. 2011-153131

Patent Document 3: Japanese Unexamined Patent Publication No. 2011-153132

SUMMARY OF THE INVENTION

Problem to be Solved by the Invention

The majority of the above conventional spray agents have such problems that they have high environmental burdens and possibly inflict on infants.

In view of the above problems in the conventional techniques, it is an object of the present invention to provide a plant growth promoting agent which can be used in the form of a spray having a low environmental burden and high safety.

Means to Solve the Problem

In consideration of the above circumstances, the present inventors have made intensive and extensive studies to find out a material having excellent insecticidal efficacy. As a result, they have found that cellulose nanofibers, which have an average thickness of 3 to 200 nm and which are prepared by fibrillating cellulose by means of a highly pressurized water jet, have high insecticidal efficacy and also plant growth promoting activity and protective activity against germ, insect pest and the like. The present invention has been completed based on the finding.

In other words, a plant growth promoting agent of the present invention comprises cellulose nanofibers and is directly or indirectly applied to, sprinkled on, or sprayed on a plant, and the insecticidally active ingredient thereof is non-chemo synthetic material.

The insecticidally active ingredient means an ingredient which specifically exhibits insecticidal activity.

The non-chemosynthetic material means a natural product prepared by a chemosynthesis-free manner.

It is preferred that the cellulose nanofibers have a crystallinity degree of 50% or more and be capable of being sprayed together with a medium.

With cellulose nanofibers having a crystallinity degree of less than 50%, even if the cellulose nanofibers are deposited on spiracles of insect pests by spraying the cellulose nanofibers on the insect pests, action of the spiracles cannot be blocked effectively.

As the medium, for example, water may be used.

It is preferred that the cellulose nanofibers have an average thickness of 3 to 200 nm and be prepared by fibrillating cellulose having α-cellulose content of 60 to 99 wt. % by means of a highly pressurized water jet. By virtue of the α-cellulose content of 60 to 99 wt. %, the fibrillation can be advanced efficiently.

The cellulose nanofibers, which have an average thickness of 3 to 200 nm and which are prepared by fibrillating cellulose by means of a highly pressurized water jet, have strong adhesion, and thus are capable of adhering to subjects by themselves. Accordingly, it is unnecessary to use adhesive.

It is considered that mite control by means of the spray agent as one form of the plant growth promoting agent exerts mite control effect by blocking spiracles of mites to arrest breathing. It is further considered that cellulose nanofibers adhere to body surfaces of mites to thereby immobilize the mites. Accordingly, no additional adhesive, surfactant or the like is required, and it is effective enough for attaining mite control effect to spray only an aqueous dispersion of cellulose nanofibers without additional adhesive, surfactant or the like. A usual sprinkler system may be used for the spraying, enabling the spraying to be carried out in a manpower-saving manner.

It is also effective to spray the spray agent over a domestic bedding, carpet or the like. The spray agent is safe and thus may be used domestically at ease.

Starch also exerts an effect of blocking spiracles to arrest activity of the spiracles as with cellulose nanofibers. However, starch has such a drawback that if starch is sprayed on subjects, propagation of mols or the like is likely to occur to thereby impair the plant growth environment. Cellulose nanofibers are not readily decomposed but decomposed at a sluggish speed by the action of enzyme in the soil such as cellulase. Glucose as a product resulting from the decomposition is rapidly absorbed through plant roots, and thus causes no deterioration of plant growth environment, but is rather expected to contribute growth promotion.

The cellulose nanofibers may be prepared by causing a highly pressurized water jet with a pressure of about 50 to 400 MPa to collide against an aqueous slurry of 0.5 to 10 wt. % cellulose.

The cellulose nanofibers may be such that solid content in an aqueous dispersion is less than 20%. (wt. % ?)

When the cellulose nanofiber content is 0.01 wt. % or more, cellulose nanofibers exhibit acaricidal activity. When the cellulose nanofiber content is up to 4.0 wt. %, the cellulose nanofibers can easily be sprayed together with the medium by means of a usual sprayer. Accordingly, the cellulose nanofiber content is preferably 0.01 to 4.0 wt. %, more preferably 0.01 to 3.0 wt. %. Further, when the cellulose nanofiber content is 0.05 to 0.15 wt. %, the cellulose nanofibers exhibit sufficient acaricidal activity.

Effect of the Invention

The plant growth promoting agent of the present invention exhibits excellent insecticidal activity and has a low environmental burden and high safety, and yet has excellent plant growing activity.

BRIEF DESCRIPTION OF DRAWINGS

FIG. 1 is a conceptual diagram of one form of a device for preparing cellulose nanofibers as an ingredient of the plant growth promoting agent of the present invention;

FIG. 2 is a conceptual diagram showing a part of the device for preparing cellulose nanofibers shown in FIG. 1 in an enlarged scale;

FIG. 3 is a conceptual diagram of another form of a device for preparing cellulose nanofibers as an ingredient of the plant growth promoting agent of the present invention;

FIG. 4 is a conceptual diagram of still another form of a device for preparing cellulose nanofibers as an ingredient of the plant growth promoting agent of the present invention;

FIG. 5 is a photograph based on which effect of the spray agent as one form of the plant growth promoting agent of the present invention is confirmed;

FIG. 6 is another photograph based on which effect of the spray agent as one form of the plant growth promoting agent of the present invention is confirmed;

FIG. 7 is a photograph based on which effect of the plant growth promoting agent of the present invention is confirmed;

FIG. 8 is graphical representation showing effect of the plant growth promoting agent; and FIG. 9 is another photograph based on which effect of the plant growth promoting agent of the present invention is confirmed.

MODE FOR CARRYING OUT THE INVENTION

[(A) Cellulose Nanofiber]

In the present invention, since cellulose nanofibers having a specific average fiber diameter and a specific average fiber length are used as a plant growth promoting material, agglomeration of the cellulose fibers is thereby suppressed to enable efficient insecticidal effect to be realized. As the cellulose nanofibers, there may be mentioned, for example, those derived from natural plants such as wood fibers, bamboo fibers, sugarcane fibers, seed hair fibers, leaf fibers and the like; nata de coco produced by acetobacter; those produced by seaweeds, sea squirt and the lie. These cellulose nanofibers may be used alone or in combination. As the cellulose, it is preferred to use pulp having α-cellulose content of 60 to 99 wt. %. When the cellulose has such purity that α-cellulose content of 60 wt. % or more, (i) fiber diameter and fiber length are regulated with ease and entanglement between fibers are thereby suppressed, and (ii) deterioration with time during storage is unlikely to occur as compared with cases where cellulose having α-cellulose content of less than 60 wt. %, and further (iii) the effect of the present invention can be enhanced. On the other hand, if cellulose having α-cellulose content of more than 99 wt. % is used, it is difficult to fibrillate the cellulose fiber to a nano-level.

The cellulose nanofibers in the present invention have an average thickness of 3 to 200 nm and are prepared by fibrillating cellulose with a highly pressurized water jet.

The average thickness was measured using a field emission scanning electron microscope JSM-7001FTTLS model produced by Japan Electron Optics Laboratory Co., Ltd.

By virtue of the fibrillation to a 3 to 200 nm average diameter level, a plant growth promoting agent having flowability and excellent sprayability can be obtained.

If the average thickness is less than 3 nm, since dewaterability is poor, it is undesirably difficult to increase solid content.

On the other hand, if the average thickness exceeds 200 nm, since fibers having fiber widths of several tens μm which are not adequately fibrillated are included, flowability is markedly lowered and sprayability becomes poor. These are undesirable.

The fibrillation of cellulose by means of a highly pressurized water jet is carried out in such a manner that a highly pressurized water jet with a pressure of about 50 to 400 MPa is caused to collide against an aqueous slurry of 0.5 to 10 wt. % cellulose. This can be carried out using, for example, the device for preparing cellulose nanofibers shown in FIG. 1. The device for preparing cellulose nanofibers 1 comprises a single chamber 2, a polysaccharide slurry supply path 3 as a first fluid medium supply path which is so disposed as to be capable of supplying a cellulose slurry to the single chamber 2, and a second fluid medium supply path 4 which permits a non-cellulosic slurry, for example, water to circulate therein via the single chamber 2. In the single chamber 2, an orifice injection part 5 is provided for orifice-injecting the non-cellulosic slurry in the second fluid medium supply path 4 in a direction intersecting the direction of cellulose slurry supply from the cellulose slurry supply path 3. The cellulose slurry supply path 3 permits the cellulose slurry to be circulated via the single chamber 2.

The cellulose slurry supply path 3 and the second fluid medium supply path 4 have a mutual intersection 6 in the single chamber 2.

The cellulose slurry supply path 3 is provided with as a cellulose supply section and comprises a tank 7 for impounding the cellulose slurry and a pump 8 which are disposed in a circulation path 9 as one form of the cellulose slurry supply path 3. On the other hand, the second fluid medium supply path 4 functions as a circulation path and comprises a tank 10, a pump 11, a heat exchanger 12, and a plunger 13, which are disposed therein.

The non-cellulosic slurry is, for example, water and comprehensively means water or a fragmented cellulose slurry containing nano-fragmented cellulose in a concentration which increases according to the degree of progress of the operation in such a manner that the water or fragmented cellulose slurry is initially water contained in the tank 10 and is then caused to pass through the mutual intersection 6 and return into the tank 10 repeatedly, as the device for preparing a cellulose nanofibers 1 operates, and consequently, develops into a nano-fragmented cellulose slurry containing nano-fragmented cellulose in such a concentration.

Figure 1:
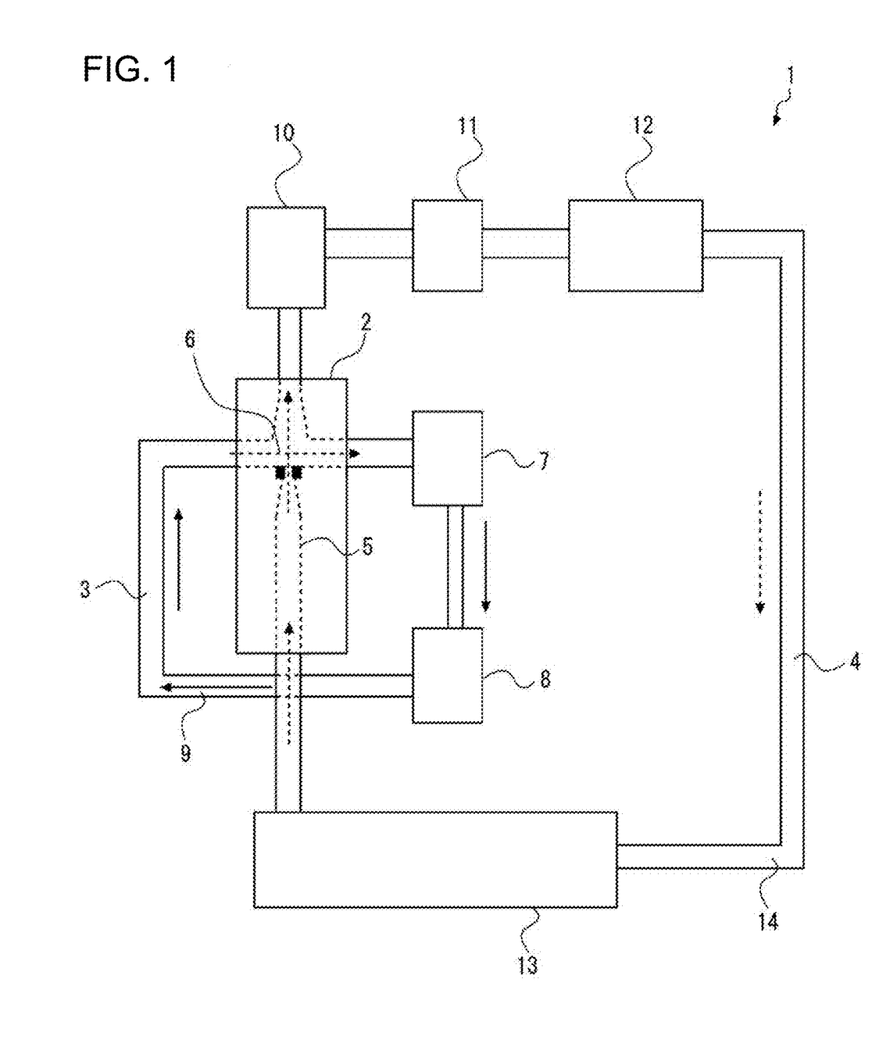
Figure 2:
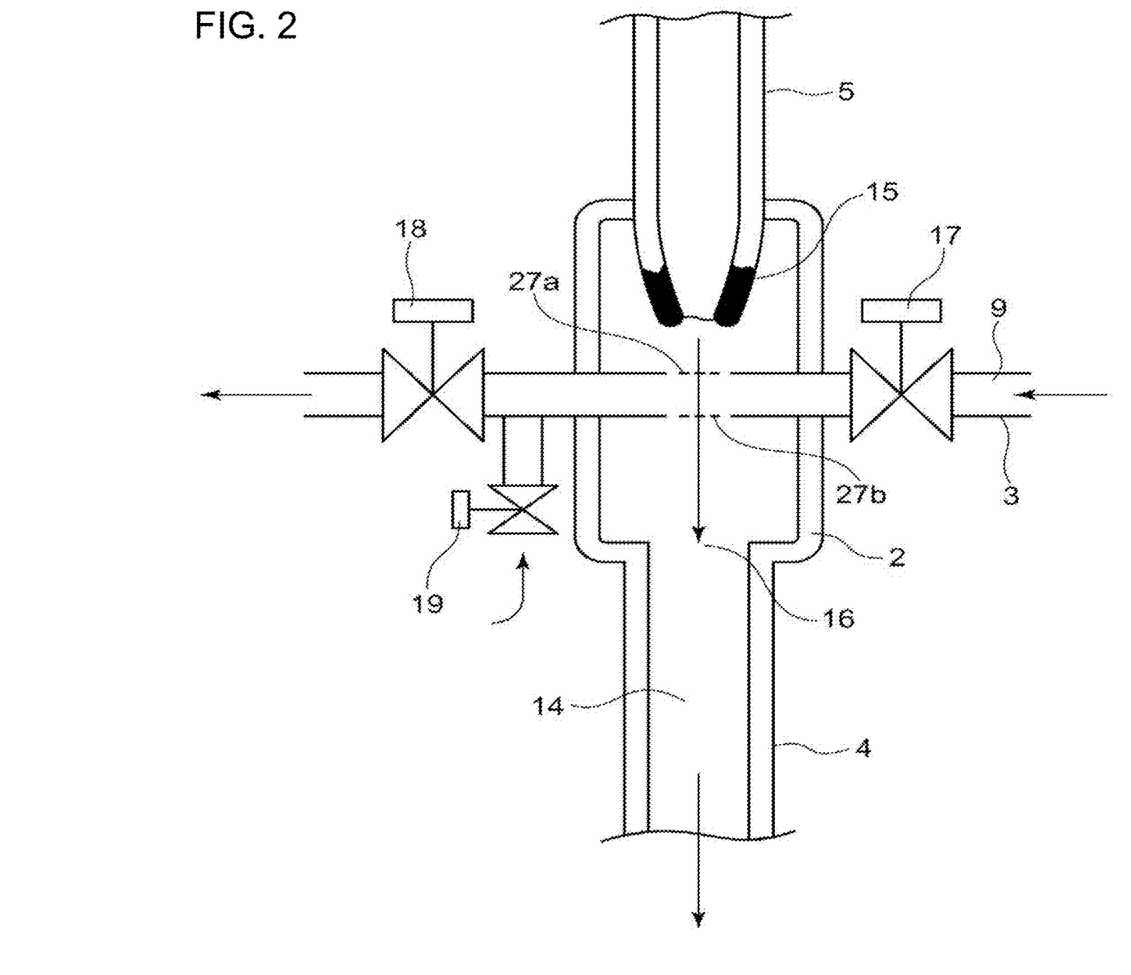

As shown in FIG. 2, the circulation path 9 as one form of the cellulose slurry supply path 3 is so disposed as to pass through the chamber 2, and an orifice injection opening 14 of an orifice injection part 5 connected to the plunger 13 in the second fluid medium supply path 4 is set to open in the chamber 2 so as to permit the non-cellulosic slurry to pass across the circulation path 9 in a direction intersecting the circulation path 9. An outlet 15 of the chamber 2 is provided at the position opposite to the orifice opening 14 in the chamber 2, and the circulation path of the second fluid medium supply path 4 is connected to the outlet 15 of the chamber 2 to constitute the second fluid medium supply path 4.

On the other hand, the circulation path 9 as one form of the cellulose slurry supply path 3 is formed using, for example, a vinyl hose, a rubber hose or the like. On the entry side of the circulation path 9 to the chamber 2, a one-way valve 16 is provided which opens only in the direction toward the chamber 2. On the exit side of the circulation path 9 from the chamber 2, a one-way valve 17 is provided which opens only in the discharge direction from the chamber 2. In addition, between the chamber 2 and the one-way valve 17, the circulation path 9 is provided with an air intake valve 18. The air intake valve 18 opens only in the direction of air intake from the outside into the circulation path 9.

According to the above-described device for preparing cellulose nanofibers, the cellulose nanofibers are prepared as follows.

The non-cellulosic slurry is circulated through the second fluid medium supply path 4 via the chamber 2. Specifically, using the pump 11, the non-cellulosic slurry in the tank 10 is caused to pass through the heat exchanger 12 and the plunger 13 and thereby circulated in the second fluid medium supply path 4. On the other hand, the cellulose slurry is circulated in the cellulose slurry supply path 3 via the chamber 2. Specifically, using the pump 8, the cellulose slurry in the tank 7 is circulated in the circulation path 9 which is formed using a vinyl hose, a rubber hose or the like.

On the basis of this, the non-cellulosic slurry circulated in the second fluid medium supply path 4 is orifice-injected against the cellulose slurry circulated in the cellulose slurry supply path 3 to pass through the chamber 2. Specifically, high pressure water is supplied from the plunger 13 to the orifice injection opening 14 connected to the plunger 13, and the high pressure water is orifice jetted from the orifice injection opening 14 toward the circulation path 9 under high pressure of about 50 to 400 MPa.

In consequence, the non-cellulosic slurry passes across, in a direction intersecting the circulation path 9, the inside of the circulation path 9 via a through-hole defined by holes 27a, 27b preliminarily provided in the circulation path 9 which is formed using, for example, a vinyl hose, a rubber hose or the like, while entraining the cellulose slurry circulating in the circulation path 9. The non-cellulosic slurry which has passed across the circulation path 9 rushes toward the outlet 15 of the chamber 2 and enters the second fluid medium supply path 4. The non-cellulosic slurry is thereby re-circulated in the second fluid medium supply path 4.

In the course of repetition of the above process, cellulose contained in the cellulose slurry circulating in the cellulose slurry supply path 3 to pass through the chamber 2 and the non-cellulosic slurry circulating in the second fluid medium supply path 4 is gradually fibrillated. Accordingly, cellulose nanofibers can be obtained which has a preferable fibrillation degree according to applications and which has high uniformity.

Figure 3:
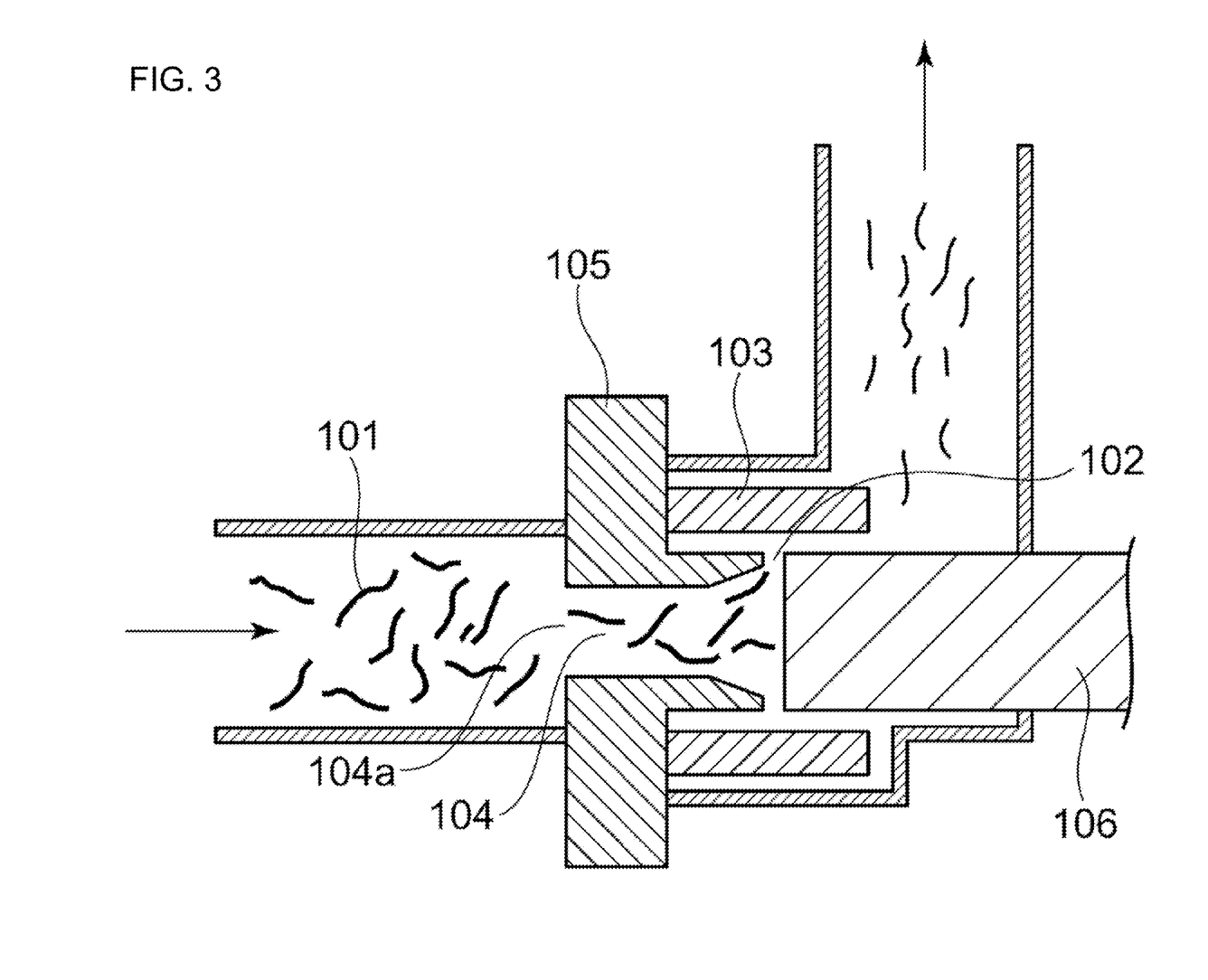

As another approach for preparing cellulose nanofibers by fibrillating cellulose with a highly pressurized water jet, there may be mentioned a homogenizing treatment method in which a dispersion comprising starting material fibers dispersed in a solvent is treated by means of a homogenizer equipped with a crushing type homovalve sheet. As shown in FIG. 3, according to the homogenizing treatment method, starting material fibers 101 pressure-fed in such a homogenizer under high pressure are forced to pass through a small diameter orifice 102 in the form of a narrow aperture and to collide against a wall surface of the small diameter orifice 102 (in particular, a wall surface of an impact ring 103) and are thereby cleaved under shearing stress or cleaving action. Thus, micro-fibrillation is effected to obtain micro-fibrils having substantially uniform fiber diameters.

Figure 4:
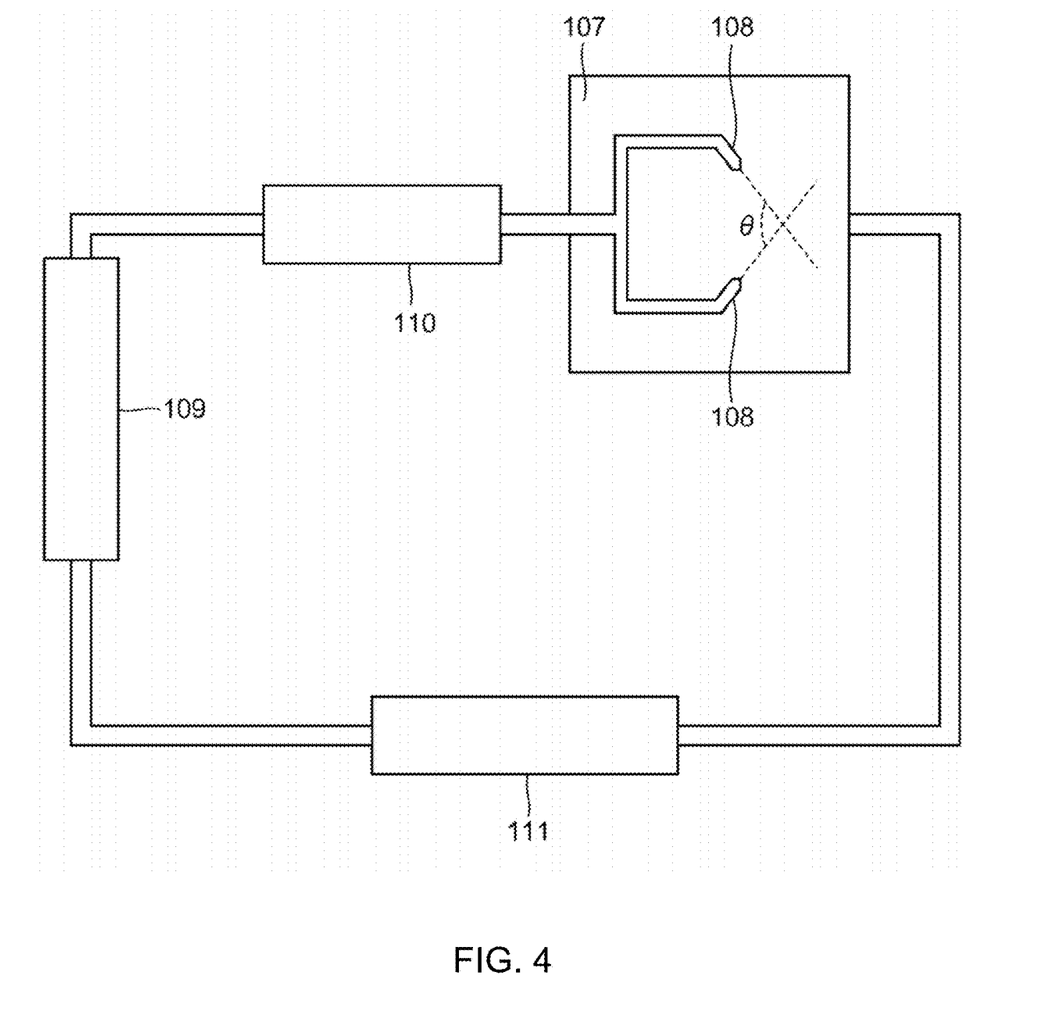

As still another approach for preparing cellulose nanofibers by fibrillating cellulose with highly pressurized aqueous jets, an aqueous counter collision method may be mentioned, This is such a method that natural cellulose fibers suspended in water are introduced into opposing two nozzles (FIG. 4: 108a, 108b) in a chamber (FIG. 4: 107) and jetted from these nozzles toward one point and thereby caused to collide (see FIG. 4). With this method, jets of an aqueous suspension of natural microcrystalline cellulose fibers (for example, Funacell manufactured by Funakoshi Co., Japan) are counter-collided to nano-fibrillate and thereby strip off surfaces of the fibers. This improves affinity of the fibers for water as a carrier and thereby enables the nano-fibrillated fibers to be finally brought to a nearly dissolved state. The device shown in FIG. 4 is of a liquid circulation type and comprises a tank (FIG. 4: 109), a plunger (FIG. 4: 110), opposing two nozzles (FIG. 4: 108a, 108b) and, if desired, a heat exchanger (FIG. 4: 111). In the device, fine particles dispersed in water are introduced into the opposing two nozzles (FIG. 4: 108a, 108b) and jetted from the opposing nozzles (FIG. 4: 108a, 108b) under high pressure to cause the fine particles to counter collide in water. In this method, only water is used other than natural cellulose fibers, and nano-fibrillation is effected by cleaving only interaction between the fibers, and hence no substantial structural change of cellulose molecules is caused. Accordingly, it is possible to obtain cellulose nanofibers with lowering of polymerization degree of cellulose associated with the cleavage minimized.

In a case where the cellulose nanofibers obtained in the above-described manner as such are qua spray which is one form of the plant growth promoting agent, when the spray has such a degree of draining that solid content in an aqueous dispersion is less than 20%, formation of aggregates is unlikely to occur. By virtue of this, sprayability is improved. If the solid content is 20% or more, the cellulose nanofibers are likely to aggregate together to cause formation of aggregates. The aggregates give rise to lowering of sprayability. The solid content is most preferably less than 16%.

As insect pests on which the spray agent as one form of the plant growth promoting agent of the present invention exerts insecticidal effect, there may be mentioned those listed below.

Tyrophagus putrescentiae (Schrank); Tetranychidae (spider mite); Aphididae (aphid); Thysanoptera (thrips); Coccoidea (scale insect); Oribatida (oribatid mite); Hemiptera insect pests, for example, Delphacidae (planthoppers) such as *Nilaparvata lugens* (brown planthopper), *Sogatella furcifera* and *Laodelphax striatella* (small brown planthopper), leaf hoppers such as *Nephotettix cincticeps* (green rice leafhopper), *Nephotettix virescens, Nephotettix nigropictus, Recilia dorsalis* (zig-zag rice leafhopper), *Empoasca onuki* (tea green leafhopper) and *Arboridia apicalis*, Aphidoidea (aphids) such as *Aphis gossypii* (cotton aphid), *Myzus persicae* (green peach aphid), *Aphis spiraecola Toxoptera citricidus, Ovatus malisuctus, Aulacorthum solani* (potato aphid) and *Brevicoryne brassicae, Hemiptera* such as *Blissus leucopterus* (chinch bug), *Cletus punctiger, Leptocorisa acta, Riptortus pedestris, Leptocorisa chinensis, Nezara viridula, Plautia stali* and *Halyomorpha halys* (brown marmorated stink bug), Aleyrodidae (whiteflies) such as *Bemicsa tabaci* (tobacco whitefly), *Trialeurodes vaporariorum* (greenhouse whitefly), *Dialeurodes citri* (citrus whitefly) and *Aleurocanthus spiniferus* (orange spiny whitefly), Ccoccocidae (scale insects), Tingitidae (lace bugs) and psyllids (jumping plant lice); *Lepdopterous pest*, for example, Pyralidae (pyralids) such as *Chilo surppessalis* (rice stem borer), *Cnaphalocrocis medinalis*, Indian meal moth, Haritalodes derogate, yellow stem borer, *Chilo polycrysus, Nymphula depunctalis, Conogethes punctiferalis, Euzophera batangensis, Ostrinia scapulalis, Evergestis forficalis*, Southwestern Corn Borer and European Corn Borer; Noctudiae, such as *Spodoptera litula* (tobacco cutworm), *Mythimna separate, Mamestra brassicae* (cabbage army worm), *Sesamia inference, Spodoptera mauritia, Naranga aenescence* (green rice caterpillar), *Agrotis ipsilon* (black cutworm), *Spodoptera exigua, Cosmophila flava, Helicoverpa armigera* (tobacco budworm), *Garella ruficirra, Telorta divergens, Eudocima tyrannus, Oraesia excavate, Agrotis segetum* (turnip moth), *Agrotis ipsilon* (black cutworm), *Autographa nigrisigna, Thysanoplusia intermixta* (chrysanthemum golden plusia), *Ctenoplusia agnata, Aedia leucomelas* and Cotton Leafworm; Pieridae such as *Artogeia rapae* crucivola (white cabbage butterfly, cabbageworm); Tortricidae (budworm) such as *Adoxophyes honmai* (smaller tea tortrix), *Homona magnanima* (tea tortrix), *Archips breviplicana, Adoxophyes orana fasciata, Archips fuscocupreanus, Adoxophyes orana, Archips xylosteana, Cydia kurokoi, Sparganosis pillariana, Choristoneura longicellana, Archips breviplicana, Epiblema leucantha* and Fruittree Leafroller; Olethreutinae; Hesperiidae (skippers) such as *Parnara guttata* (rice leaf-tier); Carposinidae; Lyonetiidae (leafminer moths); *Phyllocnistis citrella*; Gracillariidae; Gelechiidae; Oecophridae; *Artaxa subflava* (tussock moth); Psychidae; Stathmopodidae; *Gastropacha orientalis; Stauropus fagi*; Zygaenidae (burnet moth); Sphingidae (hawk moths); Geometridae; Sesiidae (clear-wing moth); Peterophoridae (plume moth); Monema *flavescens; Heliothis* spp. such as *Plutella xyrostella* (diamond-back moths), *Tinea translucens* (clothes moths) and *Tineola bisselliella* (webbing clothes moths); Diptera pests (two-winged flies), for example, *Culex* (house mosquito) such as *Culex pipiens* (common house mosquito) and *Culex tritaeniorhynchus, Aedes* (striped mosquitos) such as *Aedes aegypti* (yellow fever mosquito) and *Aedes albopictus* (tiger mosquito), Anophelinae such as *Anopheles sinensis*, Chironomidae (midge), Muscidae such as *Musca domestica* (housefly) and *Muscina stabulans*, Calliphoridae (blowfly), Sarcophagidae (flesh fly), Anthomyiidae such as *Fannia canicularis, Delia platura* (seed-corn fly) and *Delia antiqua* (onion fly), Cecidomyiidae (gall midge), Tephritidae (fruit fly), Ephydridae, Drosophilidae (vinegar fly), Psychodidae (moth fly), Tabanidae (horsefly), Simuliidae (black fly) and *Stomoxys calcitrans* (stable fly); *Coleoptera*, for example, Curculionidae, *Anthonomus grandis, Lissorhoptrus oryzophilus* (rice water weevil), *Echinocnemus squamous* (rice plant weevil), Japanese weevil, *Sitophilus zeamais* (maize weevil) and Callosobruchus (adzuki bean weevil), Chrysomelidae (leaf beetle) such as *Oulemia oryzae* (rice leaf beetle), Banded Cucumber Beetle, Western Corn Rootworm, Northern Corn Rootworm, Southern Corn Rootworm and Paddy Hispid, Tenebrionidae (darkling beetle) such as *Tenebrio molitor* and *Tibolium castaneum* (flour beetle), Cerambycidae (long-horned beetle) such as *Anoplophora malaciaca* (white-spotted longicorn beetle) and *Xylotrechus phyrrhoderus*, Scarabaeidae such as *Anomara cuprea, Popillia japonica* and *Anomara rufocupra* (soybean beetle), Nitidulidae, Chrysomelidae (leaf beetle) such as *Phyllotreta striolata, Phaedon brassicae* and *Aulacophora femoralis* (cucurbit leaf beetle), Scolytidae (bark beetle), Coccinellidae (ladybird beetle), Lyctidae, Bostrichidae, Attelabidae, Elateridae (click beetle), Coccinellidae (ladybird) such as Henosepilachna vigintioctopunctata, and Anobiidae (deathwatch); Dictyoptera such as Blattellidae (German cockroach), *Periplaneta fuliginosa* (smokybrown cockroach), *Periplaneta americana* (American cockroach), *Periplaneta brunnea* (brown cockroach) and *Blatta orientalis*; Thysanoptera such as *Thrips palmi* (melon thrips), *Scirtothrips dorsalis* and *Thrips hawaiiensis; Hymenoptera*, for example, Formicidae, and Tenthredinidae (sawfly) such as *Athalia rosae*; Orthoptera such as *Gryllotalpa africana* (mole cricket) and Acrididae (grasshopper); Siphonaptera such as *Pulex* irritants; *Anoplura* (louse) such as *Pediculus* humans (body louse) and *Pthirus pubis*; and Isoptera such as *Reticulitermes speratus* and Formosan subterranean termite.

Of these, as insect pests on which the spray agent as one form of the plant growth promoting agent of the present invention exerts particularly excellent effect, there may be mentioned soil insect pests (insects or the like which inhabit in the soil and damage to agricultural crops), for example, *Diabrotica* of Chrysomediae, e.g., corn rootworms such as *Diabrotica virgifera virgifera* LeConte (western corn rootworm), *Diabrotica barberi* Smith and Lawrence (northern corn rootworm), and *Diabrotica undecimpunctsata howardi* (southern corn rootworm), Aulacophora such as *Auracophora femoralis* Motschulsky (cucurbit leaf beetle), *Phyllotreta* such as *Phyllotreta striolata* (Fabricius) (striped flea beetle), (Scarabaeidae) *Maladera* such as *Maladera castanea, Anomala* such as *Anomala cuprea* Hope (cupreous chafer), *Anomala rufocuprea* Motshulsky (soybeen beetle) and *Anomala daimiana*, Harold, and *Papillia* such as *Papillia japonica* Newman (Japanese beetle).

When a spray agent as one form of the plant growth promoting agent of the present invention is used qua active ingredient, it is preferred that the L spray agent as one form of the plant growth promoting agent of the present invention be contained qua active ingredient in a medium such as water in an amount of 0.01% to 4.0%, preferably 0.05% to 0.15% in terms of weight ratio. The spray may be mixed with a variety of gas and thereby formulated into an aerosol or the like. As a gaseous carrier, i.e., propellant, there may be mentioned chlorofluorocarbon (CFC) gas, butane, carbon dioxide or the like.

EXAMPLES

Hereinbelow, the present invention will be described more specifically with reference to the following Examples. However, the present invention is by no means limited to the Examples.

The active ingredient used in Examples is cellulose nanofibers: trade name (Nanoforest-S®) [manufactured by Chuetsu Pulp & Paper Co., Ltd; average thickness: 36.5 nm; α-cellulose content: 85 wt. %].

Test Example 1

An aqueous dilution of cellulose nanofibers was sprinkled over a section having an area of 200 tsubo (about 661 m$^2$), which is one block in a green house controlled at a temperature of 14° C. or higher. In this manner, by carrying out the verification test only in the specific control area in the green house, escape of mites, insects or the like tales place. This enables pest repelling effect to be confirmed.

Figure 5:
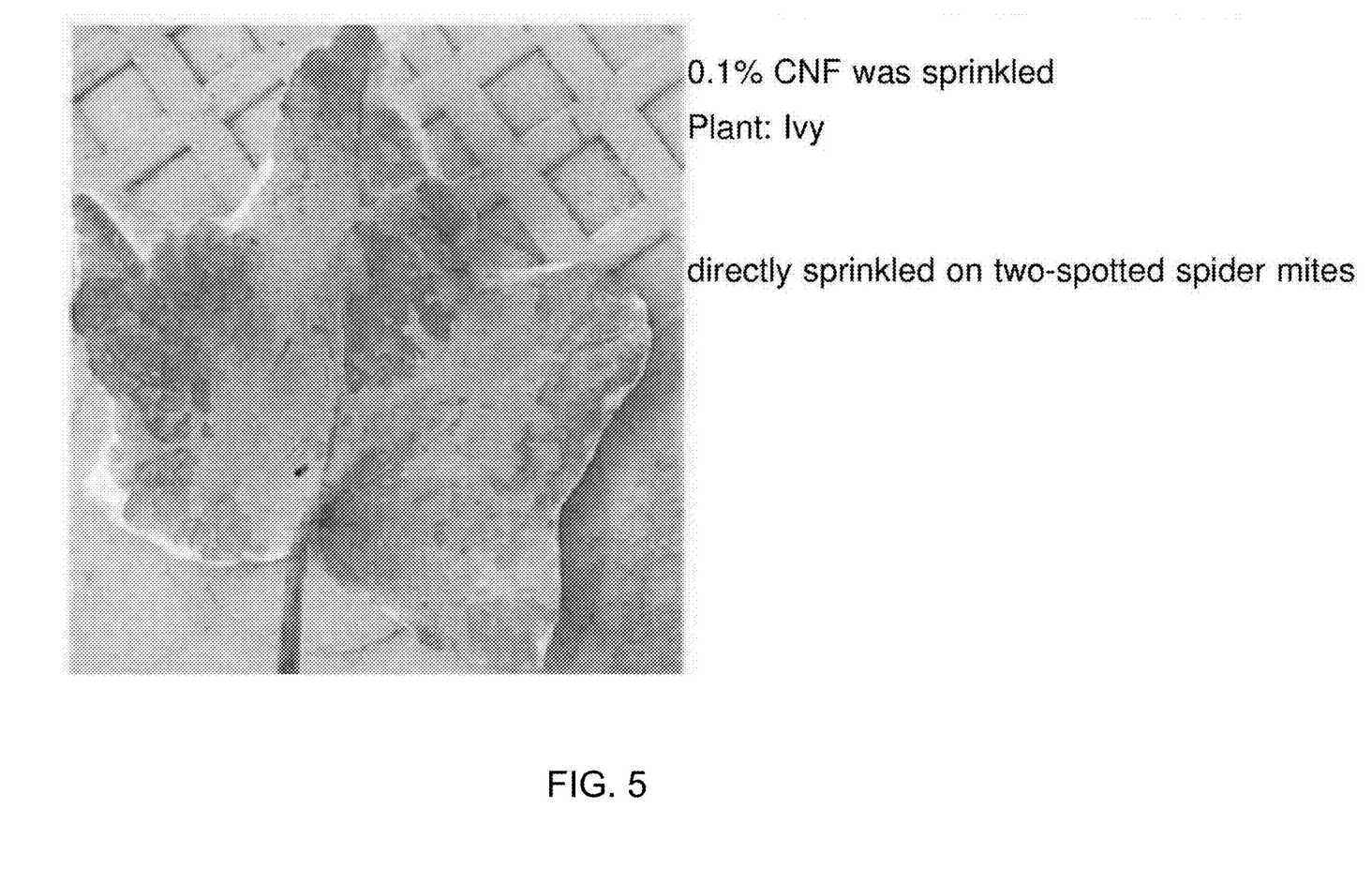

Agricultural chemicals exhibit insecticidal effects by the action of active ingredients, whereas cellulose nanofibers cover fruits to thereby protect them. Agricultural chemicals and cellulose nanofibers are fundamentally different in effect and mechanism. As shown in FIG. 5, two-spotted spider mites on which 0.1% cellulose nanofiber aqueous suspension was directly sprinkled were confirmed to be dead. This is probably because cellulose nanofibers block spiracles of the mites as with starch or the like to suppress breathing of the mites, thereby enabling control of the mites to be realized. Although agricultural chemicals are diluted by about 1,000 times for use, the cellulose nanofibers could be used in such a concentration that a 1% product thereof was diluted by about ten times.

Test Example 2

Effect of cellulose nanofibers on two-spotted spider mites was confirmed. On adults of two-spotted spider mite as subjects, cellulose nanofibers were directly sprinkled to confirm the effect. As shown in Table 1, with respect to 0.05% cellulose nanofiber aqueous dispersion, number of fatalities was 2 relative to number of the subjects of 3. With respect to 0.1% cellulose nanofiber aqueous dispersion, such effect comparable to that of already-existing agricultural chemicals: Akaritouch® manufactured by Toagosei Co., Ltd. was attained that number of fatalities was 8 relative to number of subjects of 8.

TABLE 1

| material sprayed on two-spotted spider mites (directly sprinkled) | number of subjects (fatality) |
|---|---|
| Water | 5 (0) |
| cellulose nanofibers 0.1% | 8 (8) |
| cellulose nanofibers 0.05% | 3 (2) |

TABLE 1-continued

| material sprayed on two-spotted spider mites (directly sprinkled) | number of subjects (fatality) |
|---|---|
| cellulose nanofibers 0.02% | 6 (0) |
| Akarituoch ® manufactured by Toagosei Co., Ltd. | 7 (7) |

Teat Example 3

1% cellulose nanofiber dispersion was diluted 100 times with water, this was sprayed on mandarin orange trees every about 50 days. As a result, no occurrence of black spots caused by rust mites was observed, which cause rust mite disease that is one of diseases of mandarin orange.

As Comparative Example, Sanmaito water-dispersible powder which is already-existing agricultural chemicals was diluted 2,000 times, and this was sprinkled on mandarin orange trees. No appearance of rust mites was observed also in this case. Further, dani-getter flowable which is already-existing agricultural chemicals was diluted 2,000 times, and this was sprinkled on mandarin orange trees. No appearance of rust mites was observed also in this case.

Figure 6:
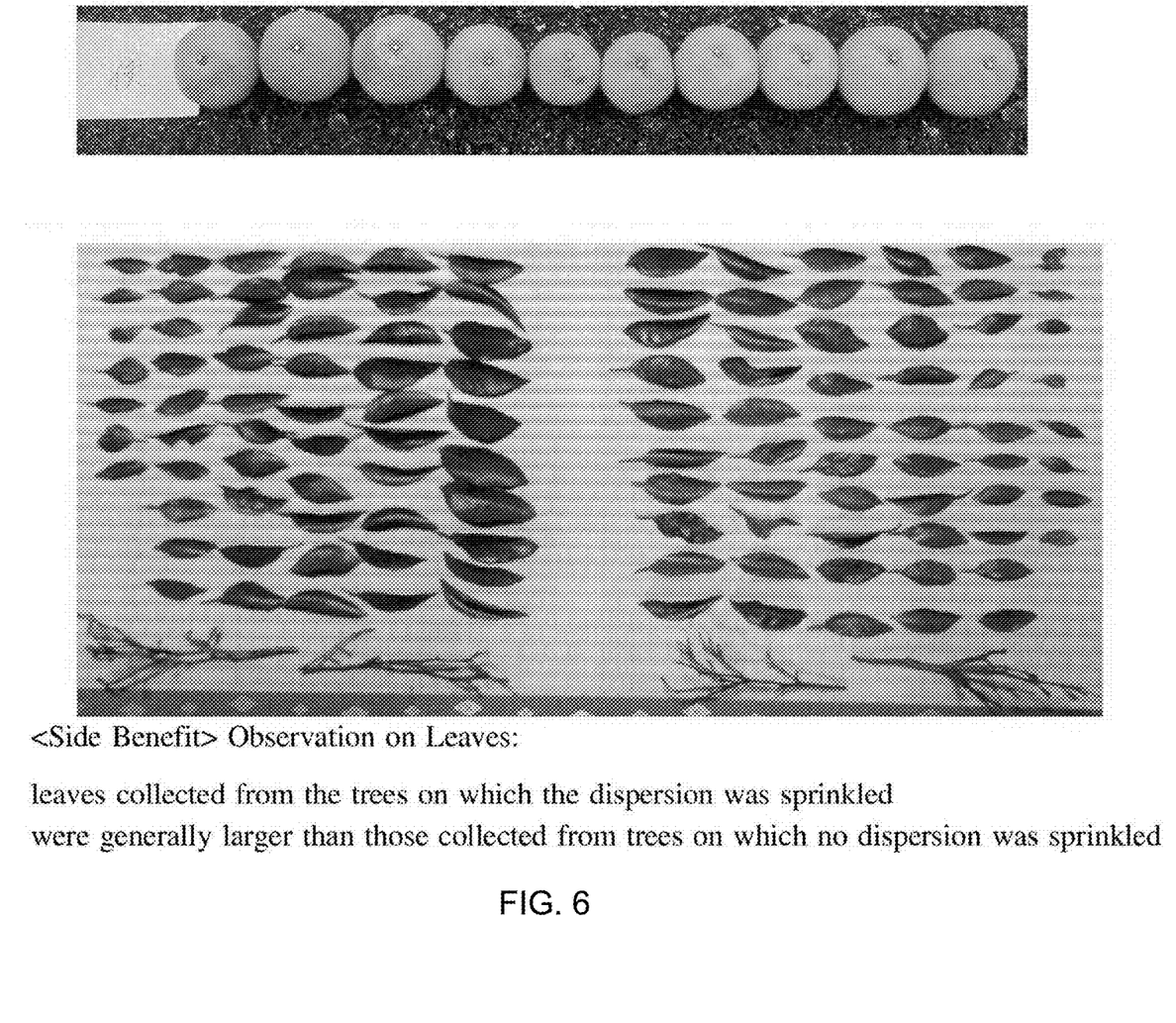

As shown in FIG. 6, it is observed that when a dispersion of cellulose nanofibers was sprinkled on the mandarin orange trees, leaves collected from the mandarin orange trees on which the dispersion was sprinkled were larger as compared with those collected from mandarin orange trees on which no dispersion was sprinkled. From this, it is believed that photosynthesis took place more actively and efficiently to thereby yield tasty mandarin oranges in the mandarin orange trees on which the dispersion was sprinkled as compared with the mandarin orange trees on which no dispersion was sprinkled.

Further, when the plant growth promoting agent of the present invention is sprinkled on a plant, the plant growth promoting agent of the present invention constitutes a protective coating on the surface of the plant to inhibit invasion of bacteria, insect pests or the like.

In addition, the plant growth promoting agent of the present invention sprinkled and thereby deposited on the surface of the plant penetrates into soil, for example, by rainfall and decomposed into sugar, acetic acid or the like by degradative enzyme such as cellulase present in the soil, thereby improving microbial distribution in the soil toward desirable environmental order for plant growth.

Test Example 4

Figure 7:
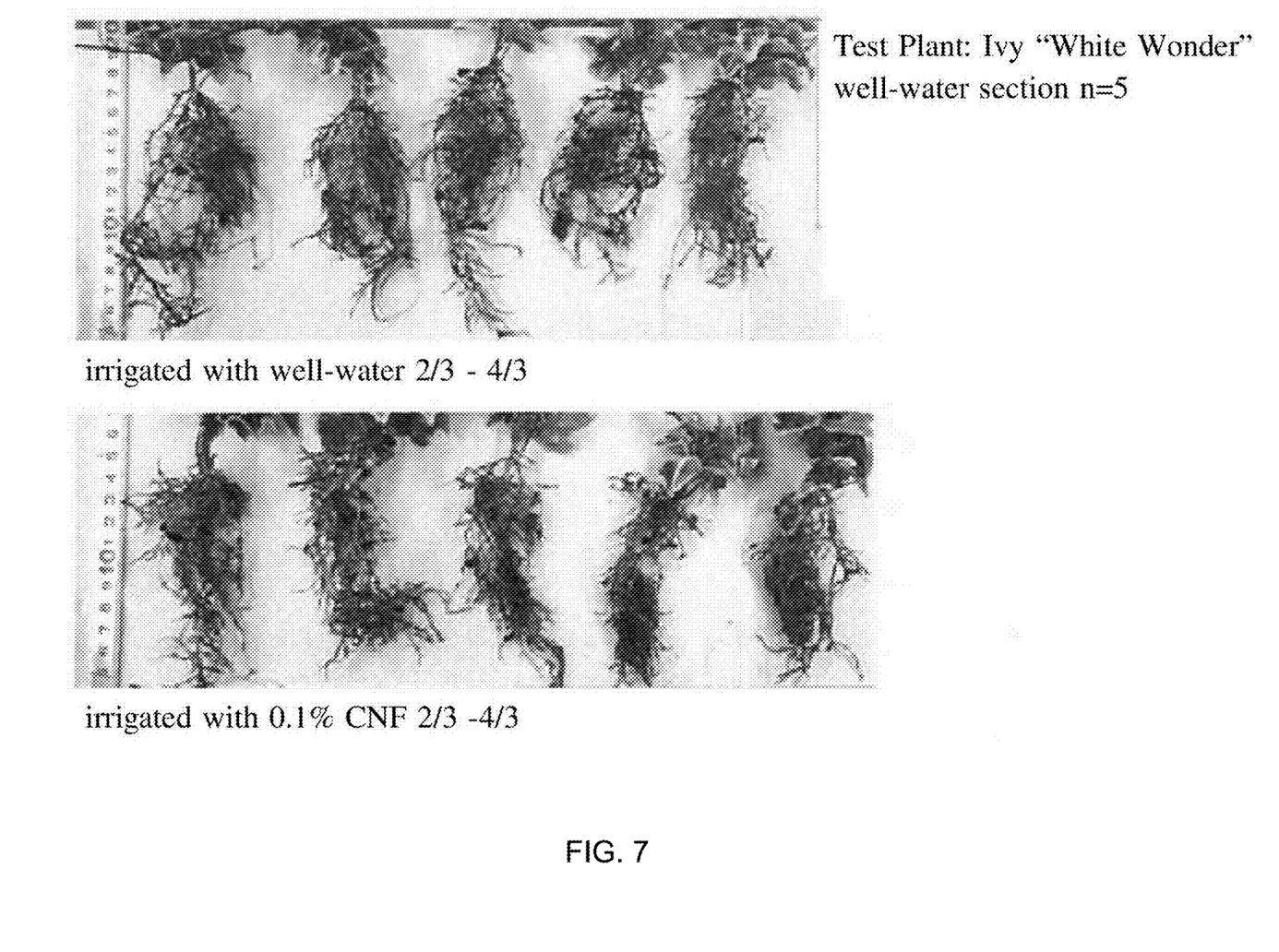
Figure 8:
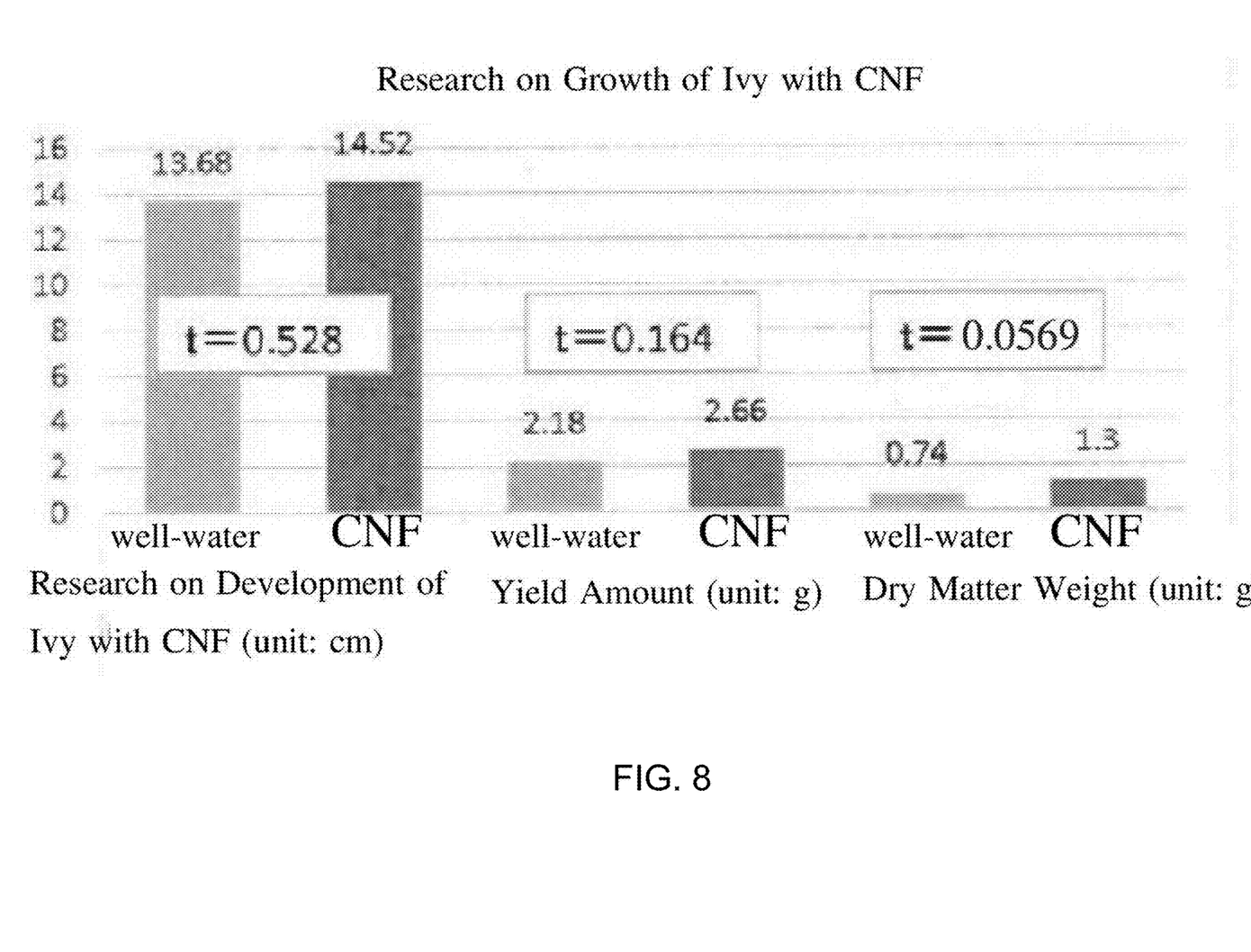
Figure 9:
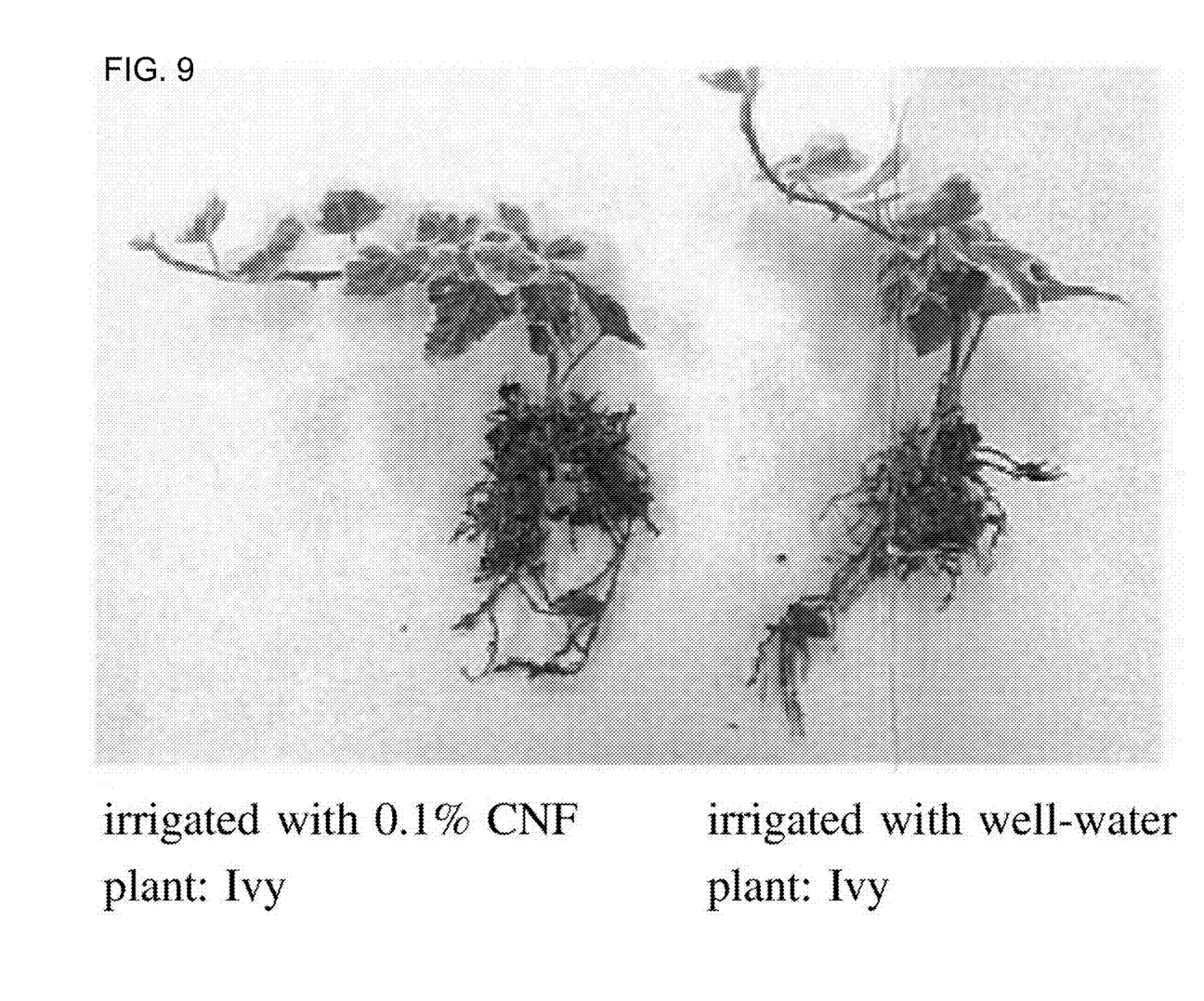

FIGS. 7 to 9 show results of use of the plant growth promoting agent of the present invention in soil irrigation in a growth environment of ivy. As shown in FIGS. 7 and 9, it is observed that growth of rootlets was better in the case where irrigation was carried out using the plant growth promoting agent of the present invention as compared with a case where irrigation was carried out using water. Further, as shown in FIG. 8, it is seen that the case where irrigation was carried out using the plant growth promoting agent was superior in any of development, yield amount and dry matter weight of ivy as compared with the case where irrigation was carried out using only water. Therefore, the plant growth promoting agent of the present invention was confirmed to be effective for promotion of root spread of ivy.

Test Example 5

In the next place, sprayability of the plant growth promoting agent of the present invention was evaluated, and the results are shown in Table 2.

Spray test of the plant growth promoting agent of the present invention was carried out at room temperature using a commercially available spray container, and Table 2 shows the results of the spray test. The evaluation was made in accordance with the following criteria.

○: Mist spread out uniformly.

Δ: Mist spread out non-uniformly at times, or extent of the spread diminished.

x: Not sprayable

As shown in Table 2, when cellulose nanofiber content in the medium in the plant growth promoting agent of the present invention was up to 3.0 wt. %, mist spread out uniformly, whereas when the cellulose nanofiber content was 4.0 wt. %, mist spread out non-uniformly at times or extent of the spread diminished. Further, when the cellulose nanofiber content was 5.0 wt. %, the dispersion could not be sprayed. From the results, when the plant growth promoting agent of the present invention is used in the form of a spray, cellulose nanofiber content in a medium should be less than 5.0 wt. % and is preferably 4.0 wt. % or less, more preferably 3.0 wt. % or less.

TABLE 2

| | CNF cont. in medium (wt. %) | | | | | |
|---|---|---|---|---|---|---|
| | 0.5 | 1.0 | 2.0 | 3.0 | 4.0 | 5.0 |
| Evaluation | ○ | ○ | ○ | ○ | Δ | x |

In the following, test results will be described which demonstrate that the plant growth promoting agent of the present invention is environment-friendly and highly safe.

Using cellulose nanofibers which have a structural formula represented by [Chem 1] below, and a molecular formula represented by [Chem 2] below and a molecular weight of about 85,000 and which are manufactured by Chuetsu Pulp & Paper Co., Ltd. (hereinafter referred to as "Nanoforest-S®"), presence or absence of micronucleus induction in 7 week-old Crl: CD1(ICR) male mice was examined. Administration was carried out by two times continuous forced oral administration at an interval of 24 hours.

[Chem 1]

[Chem 2]

$(C_6H_{10}O_5)$

In a preliminary test where a dose was set in a range of 90.0 to 360 mg/kg/day, the maximum tolerated dose of the test substance on the basis of death of the animals was estimated to be 360 mg/kg/day in both male and female subjects. Accordingly, the implementable maximum dose of 360 mg/kg/day was determined to be the highest dose of the test substance, and doses of 180 mg/kg/day and 90 mg/kg/day resulting from two-fold serial dilution (common ratio: 2) of the highest dose were set. The three doses were consequently set in total, and micronucleus test was carried out. Since it was deemed that there is no substantial gender difference in toxicity, only male animals were employed. As control groups, a negative control group and a positive control group were provided. To the negative control group, a medium (distilled water) was administered in a dose of 20 ml/kg by two times continuous forced oral administration. To the positive control group, mitomycin C was administered in a dose of 2 mg/kg/day by single-dose intraperitoneal administration.

In the micronucleus test, even 24 hours after the second administration as a specimen preparation time, no death of animals was observed with respect to any of the doses of the test substance group up to the highest dose of 360 mg/kg/day. Accordingly, the established three doses ware selected as doses for specimen observation with respect to the test substance group, and frequency of appearance of micronucleated polychromatic erythrocyte in bone marrow cells (MNPCE/PCE) was examined.

In any of the doses of the test substance group subjected to the specimen observation, MNPCE/PCEs were within the range of the background data of the negative control. Based on this, it was deemed that no substantial increase was caused in appearance of micronucleated polychromatic erythrocyte by the administration of the test substance.

It was determined from the above results that Nanoforest-S® induced no micronuclei under the conditions of this test.

Using EpiOcular™ EIT (OCL-200), presence or absence of eye irritancy of Nanoforest-S® was examined.

In the eye irritation test, cell viability with respect to Nanoforest-S® was 99.8% which was in excess of 60% as the criterion.

Therefore, Nanoforest-S® was determined to be "non-irritant" under the conditions of this test (not classified in UN GHS).

Using LabCyte EPI-MODEL 24, presence or absence of skin irritation with Nanoforest-S® was examined.

In the skin irritancy test, cell viability with respect to Nanoforest-S® was 104.5% which was in excess of 50% as the criterion.

Therefore, Nanoforest-S® was determined to be "non-irritant" under the conditions of this test (not classified in UN GHS (including category 3)).

Using lung fibroblasts of Chinese hamster (CHL/IU cells), presence of absence of clastogenicity of Nanoforest-S® was examined.

According to the results of the chromosomal aberration test, appearance frequencies of cells having structural chromosome aberration and cells having numerical chromosome aberration were within the range of the background data of the negative control with respect to all the examined doses of the test substance in any of short-time processing method in the absence of S9 mix, short-time processing method in the presence of S9 mix, and 24 hour continuous processing method. Accordingly, both structural chromosome aberration and numerical chromosome aberration were deemed to be negative.

It was determined from the above results that Nanoforest-S® induced no chromosome aberrations under the conditions of this test.

NOTE ON REFERENCE NUMBERS

2 . . . chamber
4 . . . fluid medium supply path
8, 11 . . . pump
7, 10 . . . tank
12 . . . heat exchanger
13 . . . plunger
9 . . . circulation path 3 . . . cellulose slurry supply path
14 . . . orifice-injection opening
27a, 27b . . . through hole

The invention claimed is:

1. A plant growth promoting spray agent which comprises insecticidally active cellulose nanofibers;
   wherein the insecticidally active cellulose nanofibers have a crystallinity degree of 50% or more,
   wherein the insecticidally active cellulose nanofibers have an average thickness of 3 to 200 nm, and
   wherein the insecticidally active cellulose nanofibers are obtained from cellulose having α-cellulose content of 60 to 99 wt %.

2. The plant growth promoting spray agent as claimed in claim 1, wherein the insecticidally active cellulose nanofibers are capable of being sprayed together with a medium present in the plant growth promoting spray agent.

3. The plant growth promoting spray agent as claimed in claim 1, wherein the insecticidally active cellulose nanofibers are prepared by fibrillating cellulose having α-cellulose content of 60 to 99 wt. % in the cellulose by means of a highly pressurized water jet.

4. A plant growth promoting spray agent comprising an aqueous dispersion of insecticidally active cellulose nonofibers in an amount of 0.01 to 4.0 wt. %;
   wherein the insecticidally active cellulose nanofibers have a crystallinity degree of 50% or more and an average thickness of 3 to 200 nm,
   wherein the insecticidally active cellulose nanofibers are prepared by fibrillating cellulose having α-cellulose content of 60 to 99 wt. % in the cellulose by means of a highly pressurized water jet, and
   wherein the insecticidally active cellulose nanofibers are capable of being sprayed together with an aqueous medium of the spray agent.

5. The plant growth promoting spray agent as claimed in claim 4, which consists essentially of a dispersion of the insecticidally active cellulose fibers in water.

6. A plant growth promoting spray agent comprising an aqueous dispersion of cellulose nanofibers in an amount of 0.01 to 4.0 wt. %;
   wherein the cellulose nanofibers have a crystallinity degree of 50% or more and an average thickness of 3 to 200 nm,
   wherein the cellulose nanofibers are prepared by fibrillating cellulose having α-cellulose content of 60 to 99 wt. % in the cellulose by means of a highly pressurized water jet, and
   wherein the cellulose nanofibers are capable of being sprayed together with an aqueous medium of the spray agent.

7. The plant growth promoting spray agent as claimed in claim 6, which consists essentially of a dispersion of the cellulose nanofibers in water.

* * * * *